United States Patent
Liu (10) Patent No.: US 10,893,316 B2
(45) Date of Patent: Jan. 12, 2021

(54) IMAGE IDENTIFICATION BASED INTERACTIVE CONTROL SYSTEM AND METHOD FOR SMART TELEVISION

(71) Applicant: Shenzhen Prtek Co. Ltd., Guangdong (CN)

(72) Inventor: Guohua Liu, Guangdong (CN)

(73) Assignee: Shenzhen Prtek Co. Ltd., Shenzhen (CN)

( * ) Notice: Subject to any disclaimer, the term of this patent is extended or adjusted under 35 U.S.C. 154(b) by 0 days.

(21) Appl. No.: 15/504,262

(22) PCT Filed: Jul. 31, 2015

(86) PCT No.: PCT/CN2015/085736
§ 371 (c)(1),
(2) Date: Feb. 15, 2017

(87) PCT Pub. No.: WO2016/029779
PCT Pub. Date: Mar. 3, 2016

(65) Prior Publication Data
US 2017/0257660 A1 Sep. 7, 2017

(30) Foreign Application Priority Data

Aug. 28, 2014 (CN) .......................... 2014 1 0439329

(51) Int. Cl.
*H04H 60/56* (2008.01)
*H04N 21/4223* (2011.01)
(Continued)

(52) U.S. Cl.
CPC ......... *H04N 21/4223* (2013.01); *G06F 3/002* (2013.01); *G06F 3/017* (2013.01);
(Continued)

(58) Field of Classification Search
CPC ........ H04N 21/44218; H04N 21/4223; H04N 21/4532; H04N 21/25891; H04N 21/422; G06F 3/0304; G06F 3/017; G06F 3/002
(Continued)

(56) References Cited

U.S. PATENT DOCUMENTS 6,728,881 B1 * 4/2004 Karamchetty .......... G06F 21/34
713/182
8,539,357 B2 * 9/2013 Hildreth ............. G06K 9/00335
715/733
(Continued)

FOREIGN PATENT DOCUMENTS

CN 102522008 A 6/2012
CN 103488299 A 1/2014
(Continued)

OTHER PUBLICATIONS

Extended European Search Report dated Nov. 20, 2017 from Application No. 15835028.0.
(Continued)

*Primary Examiner* — Pankaj Kumar
*Assistant Examiner* — Sahar Aqil Riaz
(74) *Attorney, Agent, or Firm* — Coats + Bennett, PLLC (57) ABSTRACT

An image recognition based interactive control system and method for a smart television. The system comprises: an image acquisition module for acquiring a card image; a gesture recognition module for recognizing a gesture of a user holding a card and outputting a gesture recognition result, wherein the gesture recognition result is channel switching, program selecting or content searching; a card recognition module for recognizing the content of the card image and outputting a card recognition result; and an interactive control module for performing a relevant inter-
(Continued)

active operation according to the gesture recognition result and the card recognition result.

11 Claims, 6 Drawing Sheets

(51) Int. Cl.
| | |
|---|---|
| H04N 21/422 | (2011.01) |
| G06F 3/03 | (2006.01) |
| G06F 3/01 | (2006.01) |
| G06F 3/00 | (2006.01) |
| H04N 21/258 | (2011.01) |
| H04N 21/442 | (2011.01) |
| H04N 21/45 | (2011.01) |

(52) U.S. Cl.
CPC ..... *G06F 3/0304* (2013.01); *H04N 21/25891* (2013.01); *H04N 21/422* (2013.01); *H04N 21/44218* (2013.01); *H04N 21/4532* (2013.01)

(58) Field of Classification Search
USPC .............................................. 725/38, 44, 12
See application file for complete search history.

(56) References Cited

U.S. PATENT DOCUMENTS

| | | | | |
|---|---|---|---|---|
| 2002/0157095 | A1* | 10/2002 | Masumitsu | H04H 40/18 725/38 |
| 2005/0099630 | A1* | 5/2005 | Reynolds | G06Q 30/02 356/402 |
| 2006/0077174 | A1* | 4/2006 | Chung | H04N 5/4403 345/156 |
| 2011/0267549 | A1 | 11/2011 | Lee et al. | |
| 2011/0304719 | A1* | 12/2011 | Sekine | G06K 9/00355 348/77 |
| 2011/0313768 | A1* | 12/2011 | Klein | G06F 3/167 704/251 |
| 2012/0060176 | A1* | 3/2012 | Chai | H04H 60/45 725/10 |
| 2012/0068917 | A1 | 3/2012 | Huang et al. | |
| 2012/0236180 | A1* | 9/2012 | Lin | H04N 21/4223 348/239 |
| 2013/0061268 | A1* | 3/2013 | Rothschild | H04N 21/23431 725/51 |
| 2013/0265226 | A1* | 10/2013 | Park | G06F 3/017 345/156 |
| 2013/0290106 | A1* | 10/2013 | Bradley | G06Q 90/20 705/14.64 |
| 2014/0183269 | A1* | 7/2014 | Glaser | G06F 21/32 235/492 |
| 2014/0373046 | A1* | 12/2014 | Franji | H04N 21/25891 725/34 |
| 2015/0002471 | A1* | 1/2015 | Mankowski | G06F 3/0421 345/175 |
| 2015/0029086 | A1* | 1/2015 | Mankowski | G06F 3/017 345/156 |
| 2015/0036050 | A1* | 2/2015 | Huang | H04N 21/4316 348/568 |
| 2015/0116094 | A1* | 4/2015 | Fujioka | G06K 7/10009 340/10.5 |
| 2015/0181111 | A1* | 6/2015 | Stewart | H04N 5/23219 348/211.8 |
| 2015/0206334 | A1* | 7/2015 | Ruzon | G06T 11/60 345/632 |
| 2015/0293595 | A1 | 10/2015 | Han et al. | |
| 2015/0365728 | A1* | 12/2015 | Lu | H04N 21/4126 725/25 |

FOREIGN PATENT DOCUMENTS

| | | | |
|---|---|---|---|
| CN | 103763453 A | 4/2014 | |
| WO | 2009067670 | 5/2009 | |
| WO | WO-2009067670 A1 * | 5/2009 | ......... G06K 9/00335 |
| WO | 2011115623 | 9/2011 | |
| WO | 2012139242 | 10/2012 | |
| WO | 2014065595 A1 | 5/2014 | |

OTHER PUBLICATIONS

International Search Report, International application No. PCT/CN2015/085736, dated Oct. 29, 2015. State Intellectual Property Office of the P.R. China, Beijing, China.

* cited by examiner

IMAGE IDENTIFICATION BASED INTERACTIVE CONTROL SYSTEM AND METHOD FOR SMART TELEVISION

FIELD OF THE INVENTION

The present disclosure relates to a field of image recognition and television (TV) control, and more particularly relates to an interactive control system and method for smart TV based on image recognition.

BACKGROUND OF THE INVENTION

TV has already and universally accessed to millions of households as a popular leisure appliance. With the development of the economy and the progress of the society, especially with the application and promotion of cable television (CATV) and digital TV technology, ordinary families are able to receive dozens of or even hundreds of channels. Therefore, the audiences need to remember the number of the channel being watched from many channels, and then input the corresponding digital number to switch to a target channel by the key of the remote control. When the audience forgets the channel number, it is very time-consuming to sequentially switch channels until the target program channel is selected by the upper channel button and the next channel button of the remote control. Therefore, it is a problem to select a particular TV channel that is usually watched from the many possible TV channels.

At present, the most common solution is to take advantage of the favorite channel configuration, i.e. configuring the personal favorite channel to a favorite channel list in advance, and then calling out the favorite channel list by the button of the remote control, and lastly selecting the channel from the favorite channel list.

However, the above solution can only configure one or more person's favorite channels to the same favorite channel list. When there are multiple users, the number of channels in the favorite channel list may be accordingly increased, thereby making it very cumbersome and time-consuming. It is also not possible to search for a program quickly.

SUMMARY OF THE INVENTION

Therefore, it is necessary to provide an interactive control system and method for smart TV based on image recognition for different users to select a channel quickly and simply and to search for a program.

An interactive control system for smart TV based on image recognition includes:

an image acquisition module configured to acquire a card image;

a gesture recognition module configured to recognize a gesture of a user holding the card and output a gesture recognition result, wherein the gesture recognition result is a channel switching, a program selecting or a content searching;

a card recognition module configured to recognize a content of the card image and output a card recognition result; and an interactive control module configured to perform related interactive operation according to the gesture recognition result and the card recognition result An interactive control method for smart TV based on image recognition includes:

acquiring a card image;

recognizing a gesture of the user holding the card and outputting a gesture recognition result, wherein the gesture recognition result is a channel switching, a program selecting or a content searching;

recognizing the content of the card image and outputting a card recognition result; and performing related interactive operation according to the gesture recognition result and the card recognition result.

In the foregoing interactive control system and method for smart TV based on the image recognition, the card image is acquired by the image acquisition module, the gesture of the user holding the card is recognized, and the gesture recognition result is output by the gesture recognition module. The card recognition module recognizes the content of the card image and output the card recognition result. The interactive control module can perform corresponding interactive operation (e.g., the channel switching, the program selecting, the content searching and so on) according to the gesture recognition result and the card recognition result. Therefore it is not necessary to select a channel by pressing a button of a remote control, such that even multiple users can quickly and easily select the channel, as well as search for the program.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. The accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
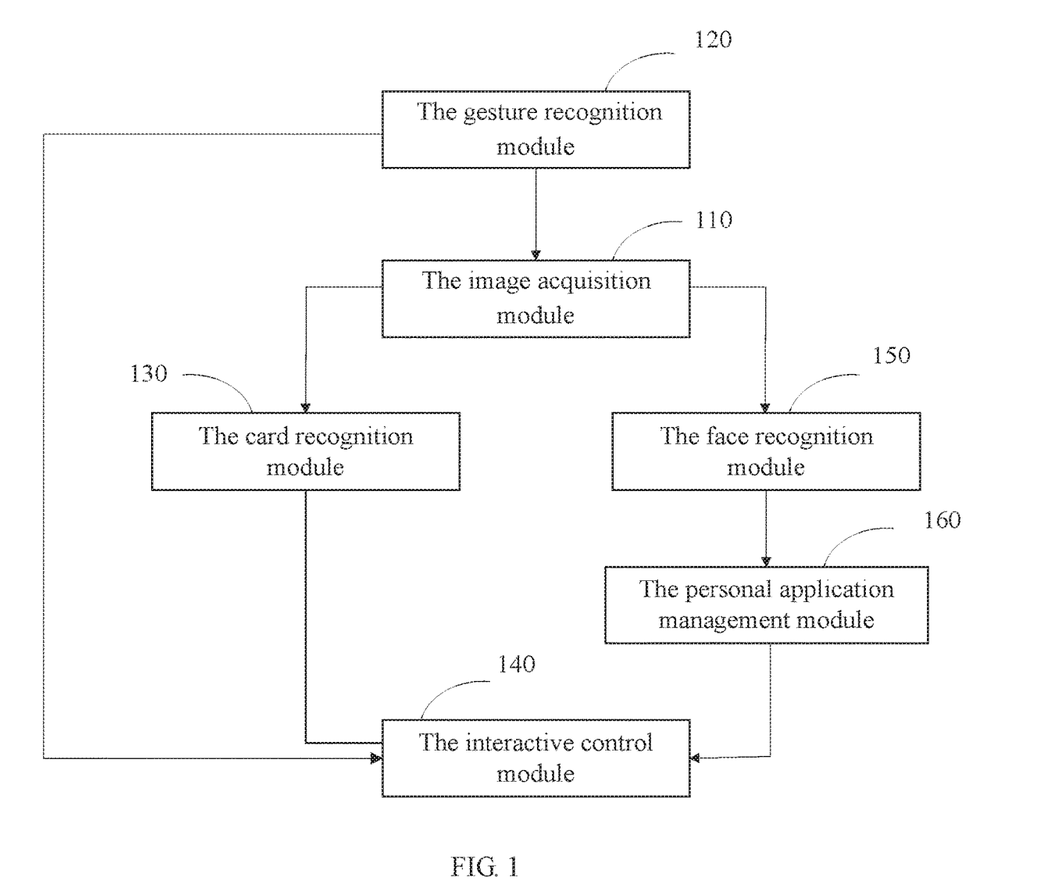
FIG. 1 is a schematic block diagram of an interactive control system for smart TV based on image recognition according to an embodiment.

Referring to FIG. 1, an interactive control system for smart TV based on image recognition according to an embodiment includes an image acquisition module 110, a gesture recognition module 120, a card recognition module 130, an interactive control module 140, a face recognition module 150, and a personal application management module 160.

The image acquisition module 110 is a special camera configured to acquire a card image or a face image. The card image can be a TV Logo, a text or a QR code. In alternative embodiments, the card image can also be a cartoon, an animal, a fruit or other images.

Figure 2:
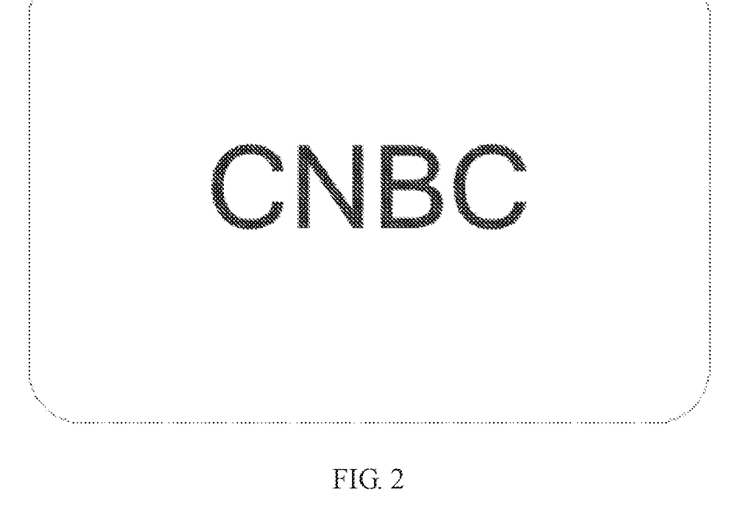
FIG. 2 illustrates a card image being a text.
Figure 3:
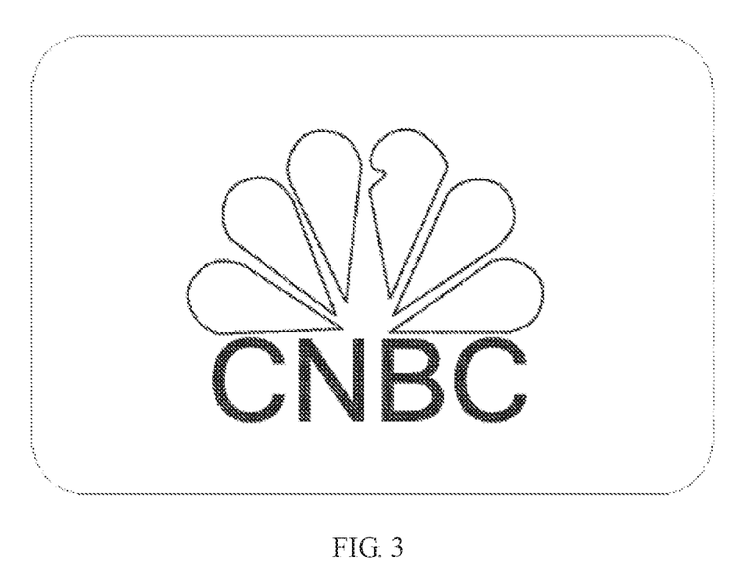
FIG. 3 illustrates a card image being a TV Logo.

For example, if the current user would like to switch a TV channel to CNBC, the user only need to hold the card printed with four letters "CNBC" as shown in FIG. 2, or take the card printed the TV Logo of CNBC as shown in FIG. 3 within a visible range of the camera, and the image acquisition module 110 will acquire the card image as shown in FIG. 2 or FIG. 3. If the current user's favorite TV channel is Shenzhen Sports Channel, and he wants to select it quickly via the face recognition, the user only needs to put his face within a visible range of the camera, then the image acquisition module 110 will acquire the face image of the user.

The gesture recognition module 120 is configured to recognize a gesture of a user holding the card and output a gesture recognition result, which can be a channel switching, a program selecting or a content searching. Specifically, when the user has different needs, he will hold the card and make a corresponding gesture within a visible range of the image acquisition 110. When the user holding the card is present within a visible range of the image acquisition module 110, the gesture recognition module 120 will automatically adjust the visible range of the image acquisition module 110 to a range which is most suitable for acquiring the content of the card (e.g. focusing the card for zooming), at the same time the gesture recognition. 120 will output the gesture recognition result.

Figure 4:
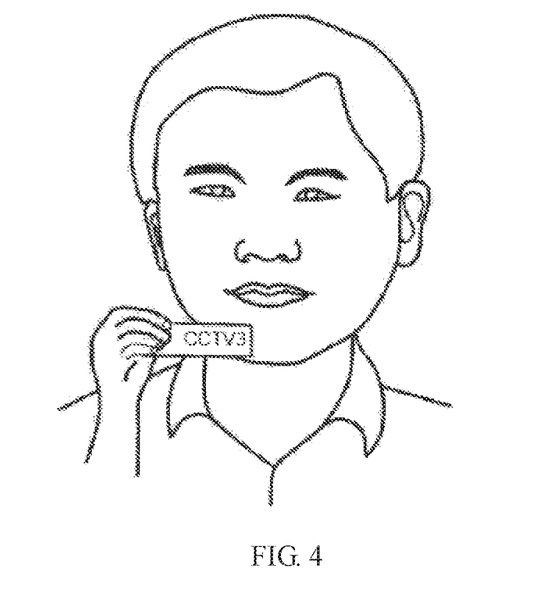
FIG. 4 illustrates a gesture of the user holding the card according to an embodiment.
Figure 5:
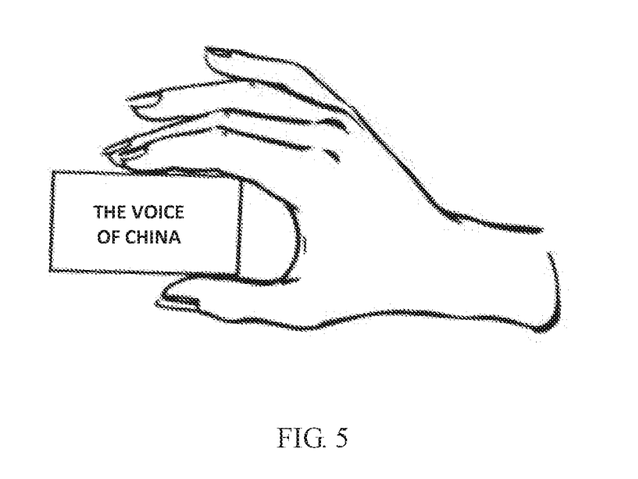
FIG. 5 illustrates a gesture of the user holding the card according to another embodiment.
Figure 6:
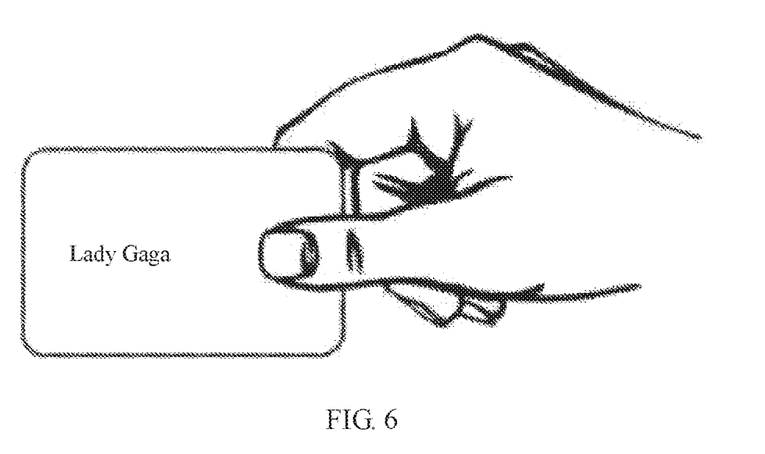
FIG. 6 illustrates a gesture of the user holding the card according to the third embodiment.

In the illustrated embodiment, the system further includes a gesture template configuration module configured to customize a gesture template as a preset gesture template. If the user holding the card makes a gesture as shown in FIG. 4, the gesture recognition module 120 will compare the gesture with the preset gesture template and output the gesture recognition result, i.e., channel switching. If the user holding the card makes a gesture as shown in FIG. 5, the gesture recognition module 120 will compare the gesture with the preset gesture template and output the gesture recognition result, i.e., program selecting. If the user holding the card makes a gesture as shown in FIG. 6, the gesture recognition module 120 will compare the gesture with the preset gesture template and output the gesture recognition result, i.e., content searching. In alternative embodiments, it should be understood that the gesture recognition result may also be copying the card content, operating directly according to the content of the card (such as turn off and turn on the TV).

The card recognition module 130 is configured to recognize a content of the card image and output a card recognition result. It does not matter that the card image is a TV Logo, a text or a QR code, the card recognition module 130 can recognize the content of the card image. The content of the card image as shown in FIGS. 2, 4 and 5 are the texts itself. Similarly, the content of card image as shown in FIG. 3 is the TV Logo itself. The card recognition module 130 will output the same card recognition result after recognizing the contents of the card image shown in FIGS. 2 and 3.

The interactive control module 140 is configured to perform related interactive operation according to the gesture recognition result and the card recognition result. The interactive control module 140 can also switch the current application to a user's favorite application according to the favorite application information output by the personal application management module 160.

Specifically, if the gesture of the user holding the card and the card image is shown as in FIG. 4, the gesture recognition result output by the gesture recognition module 120 is channel switching. When the card recognition result output by the card recognition module 130 is "China Central Television Channel 3 (CCTV3)", the interactive control module 140 will switch TV channel to "CCTV3".

Similarly, if the user knows that there is a channel playing a program named "THE VOICE OF CHINA", but forgets which channel it is, the user can hold the card written with "THE VOICE OF CHINA" and make the gesture of holding the card as shown in FIG. 5. The gesture recognition result output by the gesture recognition module 120 is program selecting. When the card recognition result output by the card recognition module 130 is "THE VOICE OF CHINA", the interactive control module 140 will switch the channel on which the program "THE VOICE OF CHINA" is played.

If the gesture of the user holding the card and the card image is shown as in FIG. 6, the gesture recognition result output by the gesture recognition module 120 is the content searching. When the card recognition result output by the card recognition module 130 is "Lady Gaga", then the interactive control module 140 will display all the information (news, videos, songs) related to Lady Gaga. If the gesture of the user holding the card and the card image is shown as in FIG. 6, the card recognition result output by the card recognition module 130 is "horse", therefore the interactive control module 140 will display all the information (photos, videos, explanations) related to "horse", which is particularly benefit to children's studying.

It should be understood that, if the gesture of the user holding the card is shown as in FIG. 6, while the card image is shown as in FIG. 5, then the gesture recognition result output by the gesture recognition module 120 is content searching. When the card recognition result output by the card recognition module 130 is "THE VOICE OF CHINA", the interactive control module 140 will display the video information about "THE VOICE OF CHINA".

The face recognition module 150 is configured to recognize the face image and output a corresponding prestored user information. In the illustrated embodiment, the face recognition module 150 includes a detecting unit and a storing unit.

The detecting unit is configured to detect whether the prestored user information corresponding to the face image exists: exits if yes, the corresponding prestored user information is output, or else new user information is registered by the personal application management module 160.

In general, if a current user is a family member, there will be corresponding prestored user information for him. However, if there is a guest paying a visit and using the television for the first time, the face recognition module 150 will not output the corresponding prestored information. Then the new user information will be registered by the detecting unit via the personal application managing module 160.

The storing unit is configured to store the new user information as the prestored user information.

The personal application management module 160 is configured to obtain favorite application information of the user according to the corresponding prestored user information and output the favorite application information to the interactive control module 140, then the interactive control module 140 will directly switch the current application to user's favorite application. In one embodiment, the application includes a channel, a program, a game, a learning, and so on.

In the illustrated embodiment, the personal application management module 160 includes a registration unit and an automatic update unit.

The registration unit is configured to register the new user information as the prestored user information. When the user uses the TV for the first time, the new user information can be registered by the registration unit, and the new user information will be stored in the storing unit of the face recognition module 150 as the prestored user information.

The automatic update unit is configured to count the number of times or length of time of the user watching the application, and update the favorite application information of the user automatically according to the number of times or length of time the user watches the application. For example, assuming an initial favorite TV channel of the user is a Sports channel, but later he begins to like to see an Entertainment Channel, and he has manually switched the Sports channel into the Entertainment channel many times or the time spent watching the Entertainment channel is longer than before, the automatic update unit will count the number of times or length of time the user watches the channel. When the number of times or length of time reaches a certain threshold value, the user's favorite application information will be updated automatically. If the user uses the TV for the first time, the application with the longest watching time will be the user's default favorite application.

In the illustrated embodiment, the threshold value of the number of times is configured to 3 and the threshold value of length of time is configured to 2 hours. In other words, when the user has manually switched the Sports Channel to the Entertainment Channel for three times in series or has watched the Entertainment Channel more than two hours at a time, the automatic update unit will update the user's favorite channel from the Sports Channel to the Entertainment Channel the next time the user uses the TV.

In alternative embodiments, it should be understood that the threshold value of the number of the times and the threshold value of length of time can be configured to be other values. For example, the threshold value of the number of the times is configured to 5 and the threshold value of length of time is configured to 3 hours.

Figure 7:
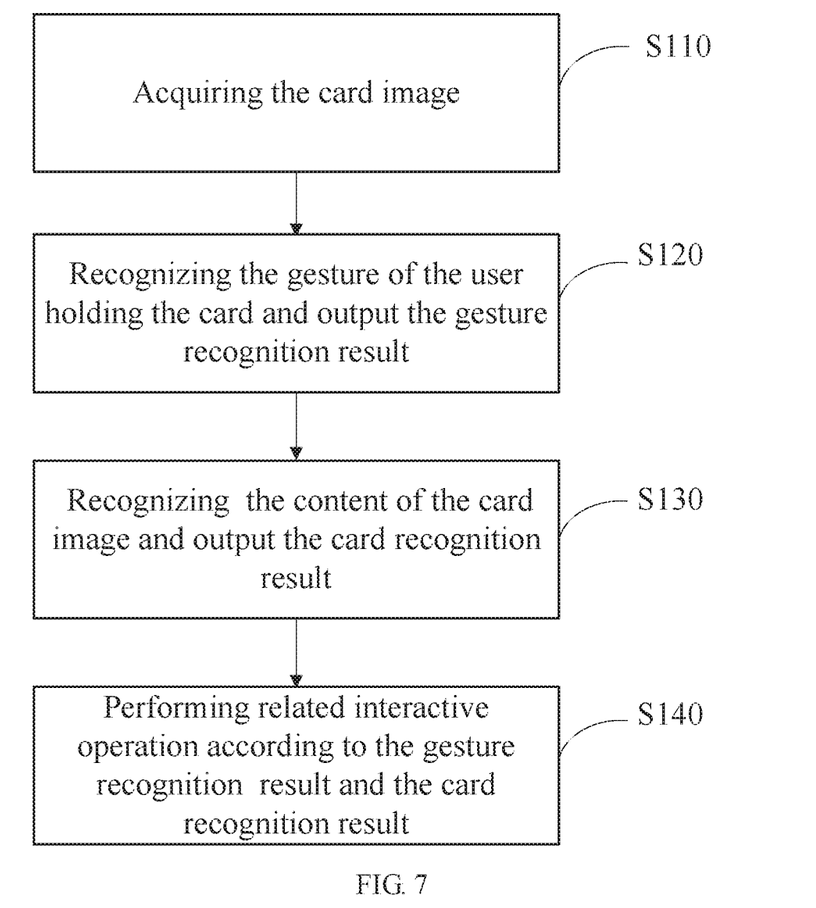
FIG. 7 is a flowchart of an interactive control method for smart TV based on image recognition according to an embodiment.

FIG. 7 is a flowchart of an interactive control method for smart TV based on image recognition according to an embodiment.

An interactive control method for smart TV based on image recognition includes:

In step S110, a card image is acquired.

In the illustrated embodiment, the card image is a TV Logo, a text or a QR code.

In step S120, a gesture of the user holding the card is recognized and a gesture recognition result is output.

In the illustrated embodiment, the gesture recognition result is a channel switching, a program selecting or a content searching.

In step S130, the content of the card image is recognized and a card recognition result is output.

In step S140, the related interactive operation is performed according to the gesture recognition result and the card recognition result.

In alternative embodiments, it should be understood that the step S120 and the step S130 may also be performed in an exchange order or at the same time.

In one embodiment, the step S120 also includes the prior step of customizing the configuration gesture template as the preset gesture template, wherein the preset gesture template is configured to be compared with the gesture of the user to output the gesture recognition result.

Figure 8:
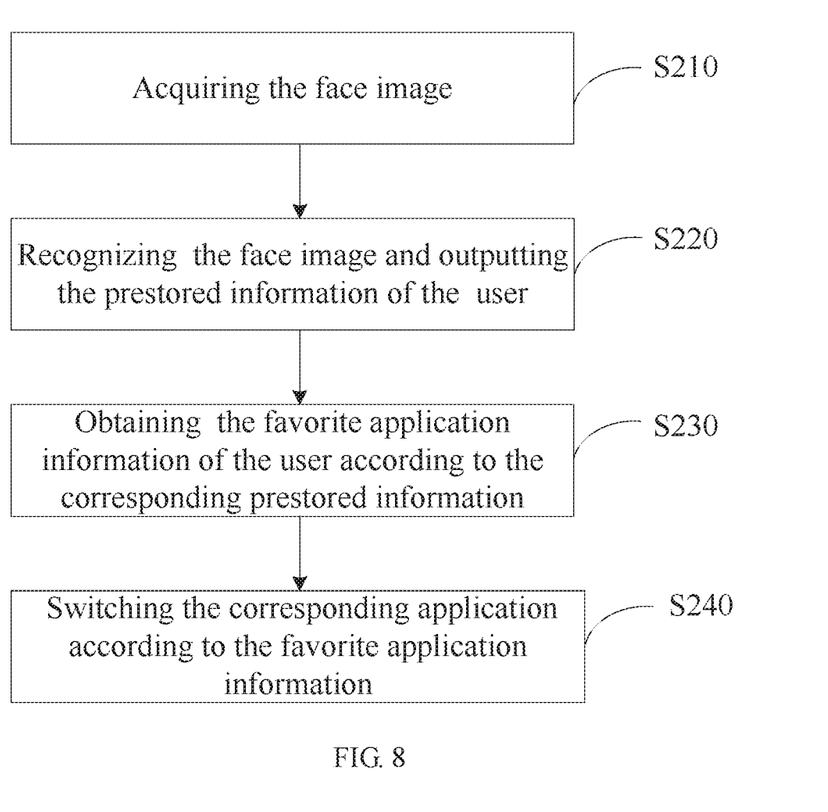
FIG. 8 is a flowchart of an interactive control method for smart TV based on image recognition according to another embodiment.

Referring to FIG. 8, which is a flowchart of an interactive control method for smart TV based on image recognition according to another embodiment.

The interactive control method for smart TV based on image recognition includes:

In step S210, a face image is acquired.

In step S220, the face image is recognized and a corresponding prestored information of the user is output.

Specifically, in the illustrated embodiment, this step includes:

When the existence of prestored user information corresponding to the face image is detected, the corresponding prestored user information is output. Otherwise, the new user information is registered.

The new user information is storied as the prestored user information.

In step 230, the favorite application information of the user is obtained according to the corresponding prestored information.

Specifically, in the illustrated embodiment, this step includes:

The number of times or length of time of the user watching the application is counted and the favorite application information of the user is updated automatically according to the number of times or length of time of the user watching the application.

The updated favorite application information is obtained.

In step S240, the corresponding application is switched according to the favorite application information.

In the foregoing interactive control system and method for smart TV based on the image recognition, the card image is acquired by the image acquisition module, the gesture of the user holding the card is recognized, and the gesture recognition result is output by the gesture recognition module. The card recognition module recognizes the content of the card image and output the card recognition result. The interactive control module can perform corresponding interactive operation (e.g., the channel switching, the program selecting, the content searching and so on) according to the gesture recognition result and the card recognition result. Therefore it is not necessary to select a channel by pressing a button of a remote control, such that even multiple users can quickly and easily select the channel, as well as searching the program.

The foregoing implementations are merely specific embodiments of the present disclosure, but are not intended to limit the protection scope of the present disclosure. It should be noted that any variation or replacement readily figured out by persons skilled in the art within the technical scope disclosed in the present disclosure shall all fall within the protection scope of the present disclosure. Therefore, the protection scope of the present disclosure shall be subject to the protection scope of the claims.

What is claimed is:

1. An interactive control system for smart TV based on image recognition, comprising:
   a camera;
   processing circuitry and a memory circuitry operatively connected to the camera, said memory circuitry containing instructions executable by said processing circuitry whereby said interactive control system is operative to:
   control the camera to capture a first digital image of a card being presented to the interactive control system by a user;
   automatically adjust a focus to acquire a content of the card;
   customize a gesture template as a preset gesture template;
   recognize a gesture of the user holding the card in the first digital image and output a corresponding gesture recognition result by comparing the gesture of the user in the first digital image to the preset gesture template, wherein the corresponding gesture recognition result is a channel switching, a program selecting or a content searching, and wherein when the user holds the card in a first manner, the corresponding gesture recognition result is the channel switching, and wherein the gesture is defined by a manner in which the user's hand is holding the card, and wherein when the user holds the card in the first manner, a portion of the user's index finger contacts a first planar surface of the card, and the user's thumb contacts a second planar surface of the card opposite the first planar surface of the card, and wherein the user's thumb in contact with the second planar surface of the card is within a visible range of the camera;

recognize the content of the card in the first digital image and output a card recognition result;

perform a related interactive operation responsive to the corresponding gesture recognition result and the card recognition result.

2. The system of claim 1, wherein the content of the card in the first digital image is a TV Logo, a text or a Quick Response (QR) code.

3. The system of claim 1, wherein the system is also operative to acquire a second digital image of the user's face, the system is further operative to:

recognize the user's face in the second digital image and output corresponding prestored user information; and obtain favorite application information of the user according to the corresponding prestored user information and output the favorite application information prior to performing the related interactive operation responsive to the corresponding gesture recognition result and the card recognition result.

4. The system of claim 3, wherein to recognize the user's face in the second digital image and output the corresponding prestored user information, the system is configured to:

detect whether the prestored user information corresponding to the the user's face exists;

output the corresponding prestored user information responsive to detecting that the prestored user information exists;

register new user information responsive to detecting that the prestored user information does not exist; and store the new user information as the prestored user information.

5. The system of claim 3, wherein to obtain the favorite application information of the user according to the corresponding prestored user information and output the favorite application information prior to performing the related interactive operation responsive to the corresponding gesture recognition result and the card recognition result, the system is configured to:

register new user information as the prestored user information; and count the number of times or length of time the user watches the application and update the favorite application information of the user automatically according to the number of times or length of time the user watches the application.

6. The system of claim 1, wherein when the user holds the card in a second manner, the corresponding gesture recognition result is the program selecting.

7. The system of claim 6 wherein when the user holds the card in the second manner, one or more of the user's fingers contact a first peripheral edge of the card, and the user's thumb contacts a second peripheral edge of the card opposite the first peripheral edge of the card.

8. The system of claim 1, wherein when the user holds the card in a third manner, the corresponding gesture recognition result is the content searching.

9. An interactive control method for smart TV based on image recognition, comprising:

capturing, by a camera, a first digital image of a card being presented to the interactive control system by a user;

recognizing a gesture of the user holding the card and outputting a corresponding gesture recognition result, wherein the gesture is defined by a manner in which the user's hand is holding the card, and wherein the corresponding gesture recognition result is a channel switching, a program selecting or a content searching, and wherein when the user holds the card in a first manner, the corresponding gesture recognition result is the channel switching, and wherein when the user holds the card in the first manner, one or more of the user's fingers contact a first planar surface of the card, and the user's thumb contacts a second planar surface of the card opposite the first planar surface of the card, and wherein recognizing a gesture of the user holding the card comprises customizing a configuration gesture template as a preset gesture template, wherein the preset gesture template is configured to be compared with the gesture of the user to output the corresponding gesture recognition result;

recognizing the content of the card in the digital image and outputting a card recognition result;

performing related interactive operation according to the corresponding gesture recognition result and the card recognition result;

acquiring a second digital image of the user's face;

recognizing the user's face in the second digital image and outputting a corresponding prestored user information;

obtaining a favorite application information of the user according to the corresponding prestored user information and outputting the favorite application information prior to performing the related interactive operation responsive to the corresponding gesture recognition result and the card recognition result;

registering new user information as the prestored user information;

counting the number of times or length of time the user watches the application;

updating the favorite application information of the user automatically responsive to determining that the number of times or length of time the user watches the application has exceeded a predetermined threshold;

obtaining the updated favorite application information; and switching to the corresponding application according to the updated favorite application information.

10. The method of claim 9, wherein the content of the card in the digital image is a TV Logo, a text or a QR code.

11. The method of claim 9, wherein recognizing the user's face in the second digital image and outputting the corresponding prestored user information comprises:

detecting that the prestored user information corresponding to the user's face in the second digital image exists and outputting the corresponding prestored user information; and storing the new user information as the prestored user information.

\* \* \* \* \*